United States Patent
Gadwale

(10) Patent No.: US 12,418,561 B2
(45) Date of Patent: Sep. 16, 2025

(54) SYSTEM FOR TRACKING THE CONTROLLING ENTITY OF INTERNET PROTOCOL (IP) ADDRESSES AND IMPLEMENTING SECURITY THREAT MITIGATION BASED ON THE CONTROLLING ENTITY

(71) Applicant: BANK OF AMERICA CORPORATION, Charlotte, NC (US)

(72) Inventor: Adithya Gadwale, Falls Church, VA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 545 days.

(21) Appl. No.: 17/531,411

(22) Filed: Nov. 19, 2021

(65) Prior Publication Data

US 2023/0164172 A1 May 25, 2023

(51) Int. Cl.
*H04L 9/00* (2022.01)
*H04L 9/40* (2022.01)

(52) U.S. Cl.
CPC ........ *H04L 63/1441* (2013.01); *H04L 63/126* (2013.01); *H04L 63/1408* (2013.01)

(58) Field of Classification Search
CPC ............... H04L 63/1441; H04L 63/126; H04L 63/1408; H04L 63/0236; H04L 63/1416; H04L 63/1425; H04L 63/1433
See application file for complete search history.

(56) References Cited

U.S. PATENT DOCUMENTS

| | | | |
|---|---|---|---|
| 6,173,283 B1 | 1/2001 | Kasso et al. | |
| 7,372,809 B2 | 5/2008 | Chen et al. | |
| 7,991,902 B2 | 8/2011 | Cross et al. | |
| 8,544,098 B2 | 9/2013 | Gustave et al. | |
| 9,300,625 B1 * | 3/2016 | Potlapally | ........... H04L 63/0876 |
| 9,769,200 B2 | 9/2017 | Sallam | |
| 9,794,281 B1 | 10/2017 | Radlein et al. | |
| 9,990,631 B2 | 6/2018 | Eisen | |
| 11,165,797 B2 | 11/2021 | Ackerman et al. | |
| 2004/0123142 A1 | 6/2004 | Dubal et al. | |
| 2007/0113090 A1 | 5/2007 | Villela | |
| 2007/0223389 A1 | 9/2007 | Basso et al. | |
| 2009/0319659 A1 | 12/2009 | Terasaki et al. | |
| 2013/0167230 A1 | 6/2013 | Etchegoyen | |
| 2017/0310686 A1 | 10/2017 | Ray et al. | |
| 2018/0262493 A1 * | 9/2018 | Andrade | ................. G06F 21/31 |
| 2019/0058724 A1 * | 2/2019 | Kraning | ................. H04L 43/16 |
| 2021/0105210 A1 | 4/2021 | Morris | |

* cited by examiner

*Primary Examiner* — Kevin Ayala
(74) *Attorney, Agent, or Firm* — Moore & Van Allen PLLC; Anup Iyer

(57) ABSTRACT

Systematically verifying the identities of entities in control of Internet Protocol (IP) addresses and determining a security threat status for each of the entities based at least on the verified identity. As incoming data packets are received from an originating IP address, the entity in control of the originating IP address and their corresponding security threat status are identified and data packets are dispositioned i.e., blocked/dropped, sequestered or authorized for further transmission, based on the security threat status of the entity in control of the IP address.

13 Claims, 6 Drawing Sheets

SYSTEM FOR TRACKING THE CONTROLLING ENTITY OF INTERNET PROTOCOL (IP) ADDRESSES AND IMPLEMENTING SECURITY THREAT MITIGATION BASED ON THE CONTROLLING ENTITY

FIELD OF THE INVENTION

The present invention is generally related to computing security and, more specifically, verifying the identity of entities in control of Internet Protocol (IP) addresses, and determining a security status for the entities based on the verified identity and dispositioning data packets based on the security status of the originating IP address.

BACKGROUND

In electronic communication networks, wrongdoers employ what are referred to as "cyberattacks" as a means for exfiltration of data. For purposes of avoiding intrusion detection systems, recent cyberattacks have been deployed from multiple different originating Internet Protocol (IP) addresses. In this regard, the wrongdoers obtain large blocks of IP addresses from reputable providers, such as Internet Service Providers (ISPs) or the like, which are subsequently used by the wrongdoers during cyberattacks.

While intrusion detection systems may rely on lists, these lists only include IP addresses that are known to be used by wrongdoers. Moreover, while it is possible to perform network-based lookups of who controls/owns an IP address, there currently exists no means to make a determination and, in particular a real-time determination, as to whether or not the entity that actually controls/owns is a legitimate entity or a suspicious entity.

Therefore, a need exists to develop systems, methods, computer program products and the like that serve to verify the identity the entity in control of an IP address and assess the security threat posed by the entity based on their verified identity. In addition, a need exists to be able to utilize the security threat posed by an entity in control of an originating IP address during real-time dispositioning of data packets (i.e., determining whether to block, sequester or allow data packets). Moreover, a need exists to able to provide such security threat data to third-parties, such as ISPs or the like when they are determining whether to provide the IP addresses to entities.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide for systems, methods, computer program product and/or the like that systematically verify the identities of entities in control (i.e., rightful possessor and/or owner) of Internet Protocol (IP) addresses and determining a security threat status for each of the entities based at least on the verified identity. Thus, according to embodiments of the present invention, as incoming data packets are received, such as at a network gateway or the like, from an originating IP address, the security threat status of the entity in control of the originating IP address is identified and the data packets are dispositioned (i.e., blocked/dropped, sequestered or authorized for further transmission) based on the security threat status of the entity in control of the IP address.

In specific embodiments of the invention, verifying the identity of the entities in control of the IP addresses includes verifying the physical location of the entity, verifying the identities of individuals in control of the entity and/or verifying the chain-of-control of the entity (e.g., the entity is controlled by an upstream entity, which is controlled by another upstream entity and so on). Moreover, in specific embodiments of the invention, verifying the identity of the entities includes tracking, over time, the identity of the entities to take into account changes in physical location of the entity, changes in individuals in control of the entity and changes in chain-of-control of the entity.

In other specific embodiments of the invention, the identities of the IP address providers (e.g., ISPs or the like) are verified and security threat status of the IP address providers are determined based on the verified status. Thus, according to embodiments of the invention, dispositioning of data packets may rely on the security threat status of the entity in control of the IP address and/or the security threat status of the entity that provided the IP address to the entity in control of the IP address.

Additionally, in other specific embodiments of the invention, the security threat status of the entities in control of the IP addresses may be used by IP address providers (e.g., ISPs or the like) decisioning on whether the IP provider should provision IP addresses to an entity desiring to obtain/control IP addresses.

A system for mitigating a security threat posed by Internet Protocol (IP) traffic, defines first embodiments of the invention. The system includes a first computing platform having a first memory and at least one first processing device in communication with the first memory. The first memory stores identity verification and security threat status subsystem that includes first instructions that are executable by one or more of the at least one first processing device. The first instructions are configured to receive first notifications, each first notification indicating an entity in control (e.g., rightful possession or the like) of one or more IP addresses. In response to receiving the notifications, the first instructions are further configured to verify identities of the entities in control of the one or more IP addresses, and determine and store, for each of the entities based at least on the corresponding verified identity, a security threat status posed by IP traffic using the one or more IP addresses in control of the corresponding entity.

Additionally, the system includes a second computing platform having a second memory and at least second processing device in communication with the second memory. The second memory stores IP traffic security threat mitigation sub-system that includes second instructions that are executable by one or more of the at least one second processing devices. The second instructions are configured to receive data packets having an originating IP address, in response to receiving the data packets determine an entity in control of the originating IP address, access the identity verification and security threat status sub-system to identify the security threat status associated with the entity in control of the originating IP address, and disposition the data packets based on the security threat status associated with the entity in control of the originating IP address.

In specific embodiments of the system, the first instructions configured to verify identities of the entities in control of the one or more IP addresses are further configured to verifying the identities by one or more of (i) verifying physical locations of the entities, (ii) verifying identities of individuals in control of the entities, and (iii) verifying identities of one or more upstream entities in control of the entity (i.e., chain-of-control of upstream entities that have control over the entity).

In other specific embodiments of the system, the first instructions configured to verify identities of the entities in control of the one or more IP addresses are further configured to track, over time, the identities of the entities in control of the one or more IP addresses.

In additional specific embodiments of the system, the first instructions configured to determine the security threat status are further configured to determine a security threat score associated with the entity in control of the originating IP address. In such embodiments of the system, the second instructions configured to access the identity verification and security threat status sub-system to identify the security threat status are further configured to access the identity verification and security threat status sub-system to identify the security threat score and the the second instructions configured to disposition the data packets are further configured to disposition the data packets based on the security threat score (e.g., different security score thresholds dictate different dispositions of the data packets).

In specific embodiments of the system, the second instructions configured to disposition the data packets further defines the disposition as one selected from the group consisting of (i) hold the data packets for suspicious intent investigation, (ii) block the data packets from further data transmission, and (iii) allow the data packets for further data transmission.

According to further specific embodiments of the system, the first instructions are further configured to receive second notifications, each second notification indicating a second entity responsible for providing the one or more IP addresses to the one or more entities. The second instructions are further configured to verify identities of the second entities responsible for providing the one or more IP addresses, and determine, for each of the second entities based at least on the corresponding verified identity, a second security threat status posed by IP traffic using the one or more IP addresses provided by a corresponding second entity. In further related embodiments of the system, the second instructions are further configured to determine a second entity that provided the originating IP address to the entity. Moreover, the second instructions configured to access the identity verification and security threat status sub-system are further configured to access the identity verification and security threat status sub-system to further identify the second security threat status associated with the second entity responsible for providing the originating IP address, and the second instructions configured to disposition the data packets are further configured to disposition the data packets based further on the second security threat status associated with the second entity responsible for providing the originating IP address.

In other specific embodiments the system further includes a third computing platform having a third memory and at least one third processing device in communication with the third memory. The third memory stores IP address procurement security threat mitigation sub-system that includes third instructions that are executable by one or more of the at least one third processing devices. The third instructions are configured to receive a request by an entity to control one or more IP addresses, access the identity verification and security threat status sub-system to identify the security threat status associated with the entity requesting control of the one or more IP addressed, and decision the request by the entity for control of the one or more IP addresses based on the security threat status.

A computer-implemented method for mitigating a security threat posed by Internet Protocol (IP) traffic defines second embodiments of the invention. The computer-implemented method is executed by one or more computer processing devices. The method includes receive first notifications, each first notification indicating an entity in control of one or more IP addresses. In response to receiving the first notifications, the method further includes verifying identities of the entities in control of the one or more IP addresses and determining, for each of the entities based at least on the corresponding verified identity, a security threat status posed by IP traffic using the one or more IP addresses in control of the corresponding entity. In response to determining the security threat statuses, the security threat statuses are stored in a database. Further, the method includes receiving data packets having an originating IP address. In response to receiving the data packets, the method includes determining an entity in control of the originating IP address and accessing the database to identify the security threat status associated with the entity in control of the originating IP address. In response to identifying the security threat status, the method includes dispositioning the data packets (i.e., dropping/blocking, sequestering or allowing transmission of the data packets) based on the security threat status associated with the entity in control of the originating IP address.

In specific embodiments of the computer-implemented method, verifying the identities of the entities in control of the one or more IP addresses further includes verifying the identities by one or more of (i) verifying physical locations of the entities, (ii) verifying identities of individuals in control of the entities, and (iii) verifying identities of one or more upstream entities in control of the entity. In further specific embodiments of the computer-implemented method, verifying the identities of the entities in control of the one or more IP addresses further includes tracking, over time, the identities of the entities in control of the one or more IP addresses.

In other specific embodiments of the computer-implemented method, determining the security threat status further comprise determining a security threat score associated with the entity in control of the originating IP address. In such embodiments of the computer-implemented method, wherein accessing the database to identify the security threat status further comprises accessing the database to identify the security threat score and dispositioning the data packets further comprises dispositioning the data packets based on the security threat score (e.g., different security threat score thresholds dictate how the data packets are dispositioned).

In further specific embodiments the computer-implemented method further includes receiving second notifications, each second notification indicating a second entity responsible for providing the one or more IP addresses to the one or more entities. In response to receiving the second notifications, the method includes verifying identities of the second entities responsible for providing the one or more IP addresses, determining, for each of the second entities based at least on the corresponding verified identity, a second security threat status posed by IP traffic using the one or more IP addresses provided by a corresponding second entity and storing the second security threat status in the database. Further, the method includes in response to receiving the data packets, determine a second entity that provided the originating IP address to the entity. In such embodiments of the method, accessing the database further comprises accessing the database to further identify the second security threat status associated with the second entity responsible for providing the originating IP address, and dispositioning the data packets further comprises dispositioning the data packets based further on the second security threat status associated with the second entity responsible for providing the originating IP address.

In other embodiments the computer-implemented method further includes receiving a request by an entity to control one or more IP addresses, accessing the database to identify the security threat status associated with the entity requesting control of the one or more IP addressed, and decisioning the request by the entity for control of the one or more IP addresses based on the security threat status.

A computer program product including a non-transitory computer-readable medium defines third embodiments of the invention. The computer readable medium includes a first set of codes for causing a computer to receive first notifications, each first notification indicating an entity in control of one or more IP addresses. Additionally, the computer-readable medium includes a second set of codes for causing a computer to verify identities of the entities in control of the one or more IP addresses, a third set of codes for causing a computer to determine, for each of the entities based at least on the corresponding verified identity, a security threat status posed by IP traffic using the one or more IP addresses in control of the corresponding entity, and a fourth set of codes for causing a computer to store the security threat status for each of the entities in a database. In addition, the computer-readable medium includes a fifth set of codes for causing a computer to receive data packets having an originating IP address and a sixth set of codes for causing a computer to, in response to receiving the data packets, determine an entity in control of the originating IP address. Moreover, the computer-readable medium includes a seventh set of codes for causing a computer to, access the database to identify the security threat status associated with the entity in control of the originating IP address, and an eighth set of codes for causing a computer to disposition the data packets based on the security threat status associated with the entity in control of the originating IP address.

In specific embodiments of the computer program product, the second set of codes are further configured to cause the computer to verify the identities by one or more of (i) verifying physical locations of the entities, (ii) verifying identities of individuals in control of the entities, and (iii) verifying identities of one or more upstream entities in control of the entity. In related embodiments of the computer program product, the second set of codes are further configured to cause the computer to track, over time, the identities of the entities in control of the one or more IP addresses.

In other specific embodiments of the computer program product, the computer-readable medium includes a ninth set of codes receiving second notifications, each second notification indicating a second entity responsible for providing the one or more IP addresses to the one or more entities and a tenth set of codes for causing a computer to verify identities of the second entities responsible for providing the one or more IP addresses. In addition, the computer-readable medium includes an eleventh set of codes for causing a computer to determine, for each of the second entities based at least on the corresponding verified identity, a second security threat status posed by IP traffic using the one or more IP addresses provided by a corresponding second entity, a twelfth set of codes for causing a computer to store the second security threat status in the database, and a thirteenth set of codes for causing a computer to, in response to receiving the data packets, determine a second entity that provided the originating IP address to the entity. In such embodiments of the computer program product, the seventh set of codes are further configured to cause the computer to access the database to further identify the second security threat status associated with the second entity responsible for providing the originating IP address, and the eighth set of codes are further configured to cause the computer to dispositioning the data packets based further on the second security threat status associated with the second entity responsible for providing the originating IP address.

In further embodiments of the computer program product, the computer-readable medium further includes a ninth set of codes for causing a computer to receive a request by an entity to control one or more IP addresses, a tenth set of codes for causing a computer to access the database to identify the security threat status associated with the entity requesting control of the one or more IP addressed, and an eleventh set of codes for causing a computer to decision the request by the entity for control of the one or more IP addresses based on the security threat status.

Thus, according to embodiments of the invention, which will be discussed in greater detail below, the present invention provides for systematically verifying the identities of entities in control of Internet Protocol (IP) addresses and determining a security threat status for each of the entities based at least on the verified identity. As incoming data packets are received from an originating IP address, the invention provides for the entity in control of the originating IP address and their corresponding security threat status to be identified and data packets are dispositioned i.e., blocked/ dropped, sequestered or authorized for further transmission, based on the security threat status of the entity in control of the IP address.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
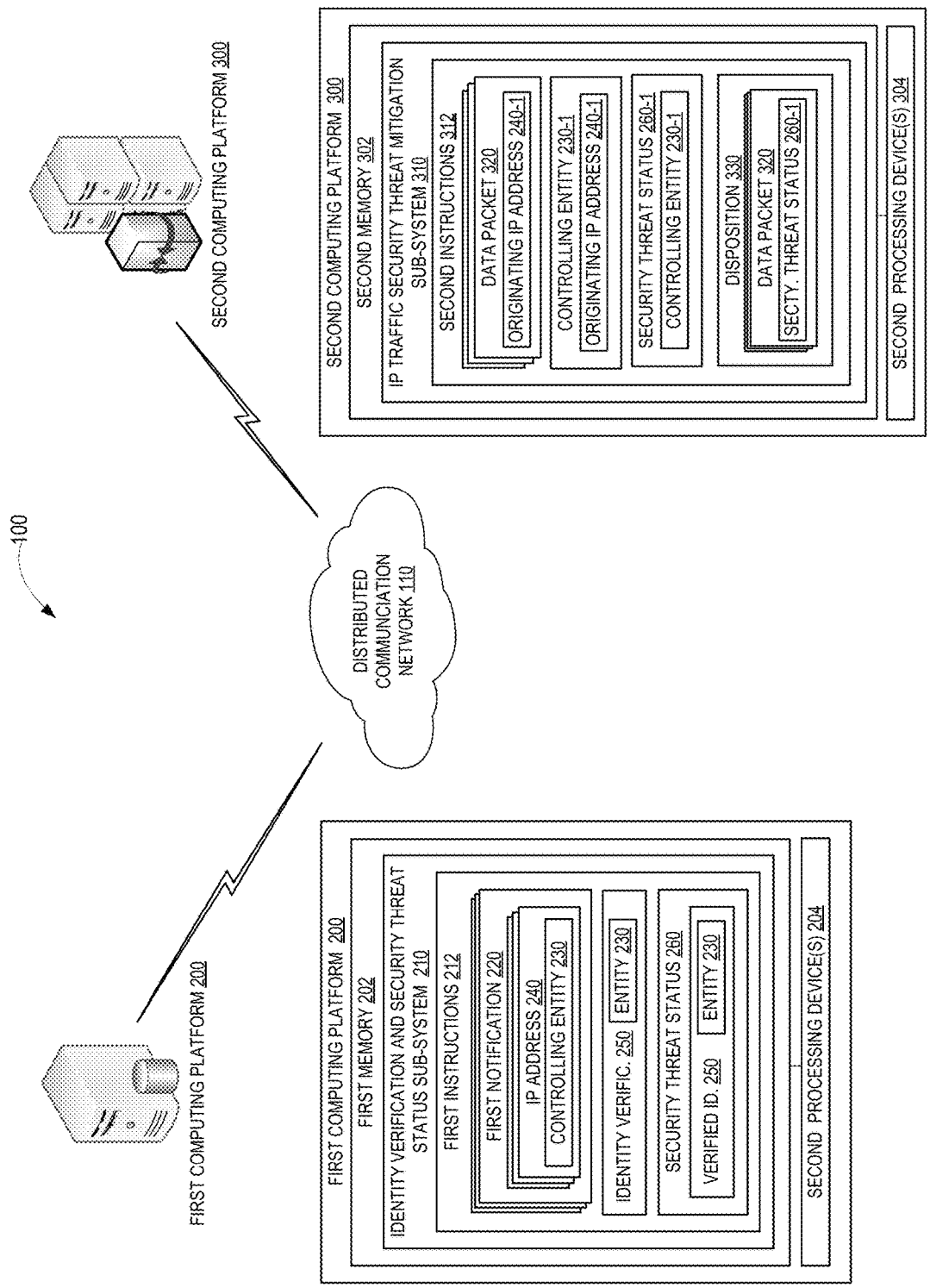
Figure 2:
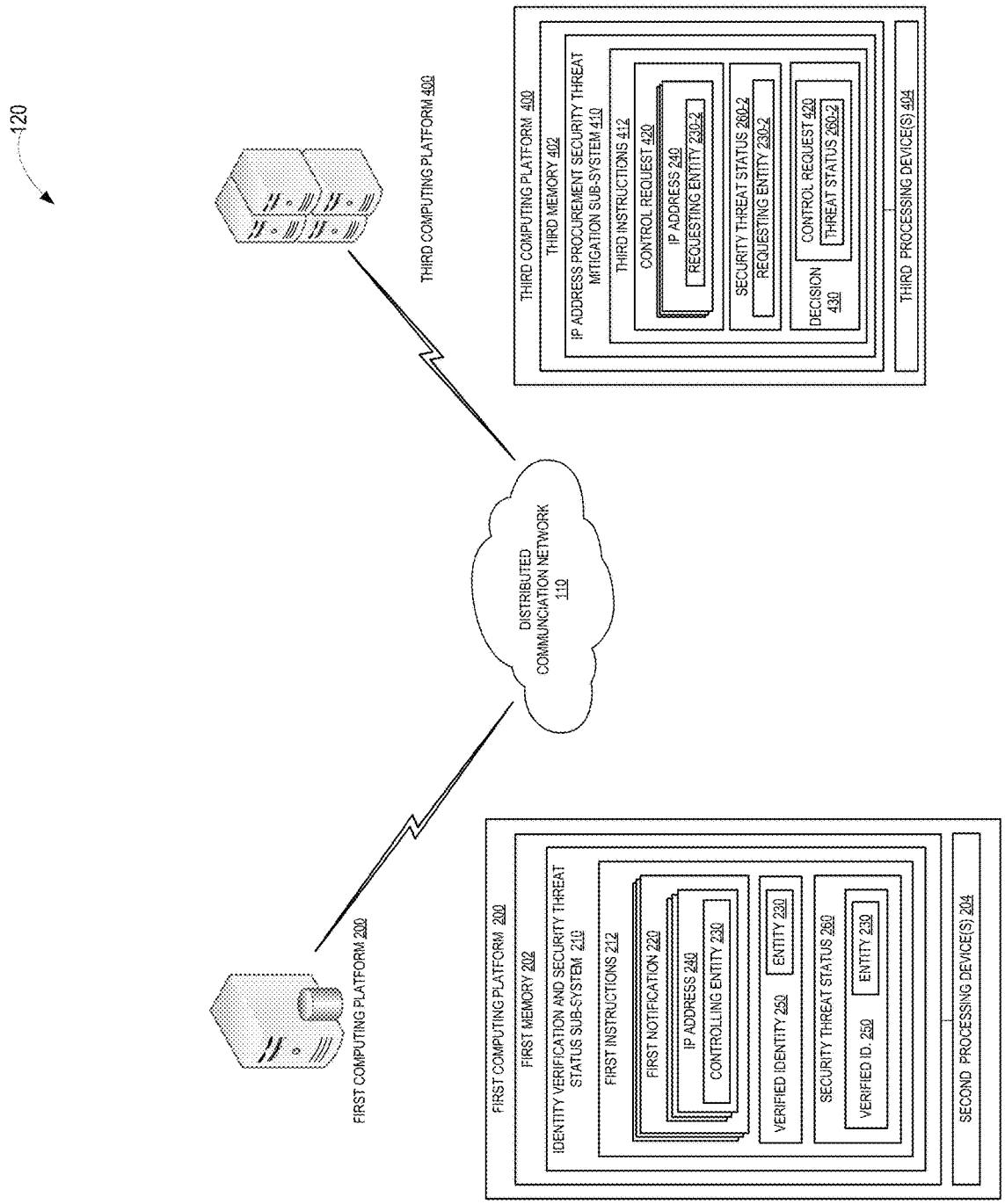
Figure 3:
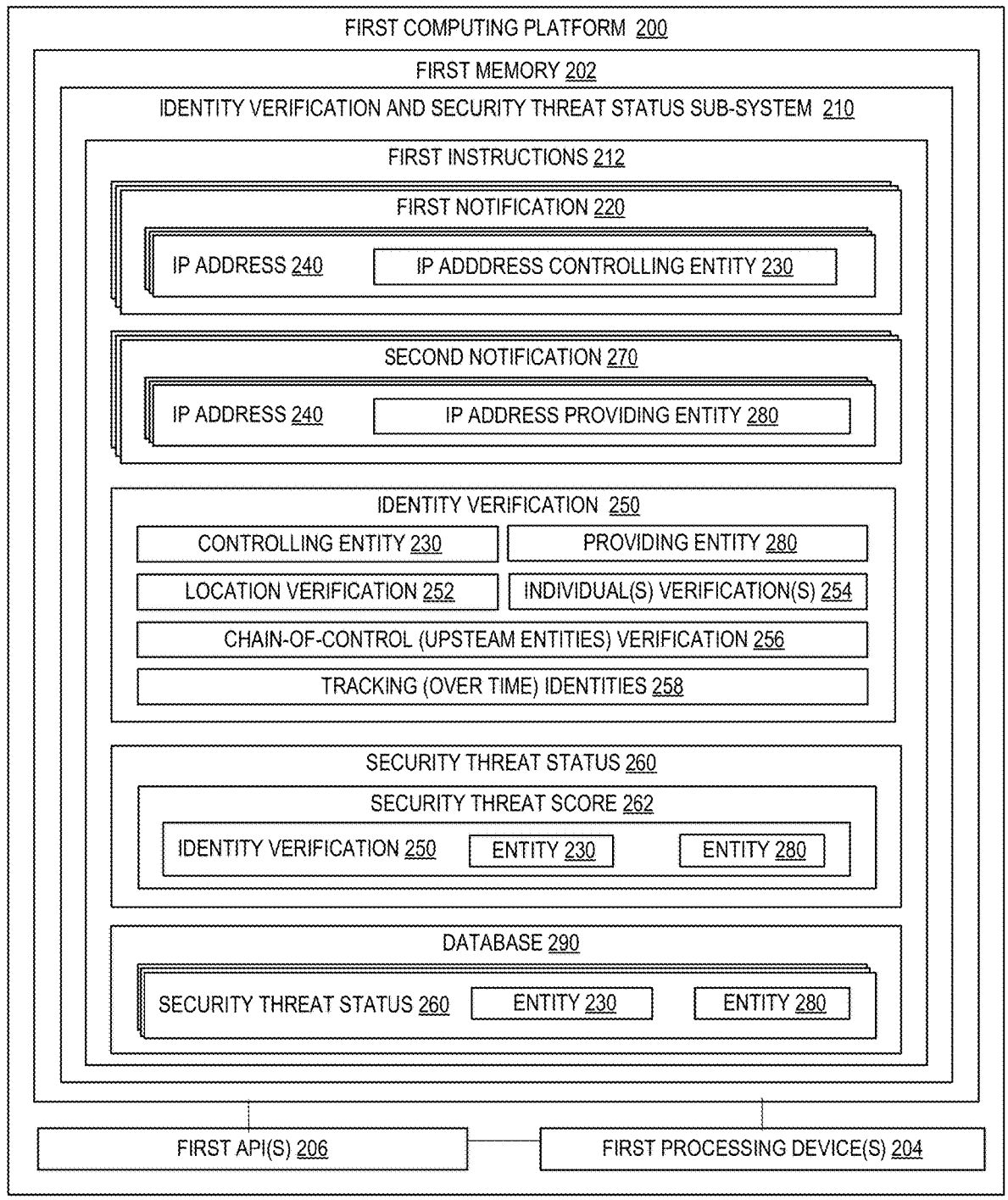
Figure 4:
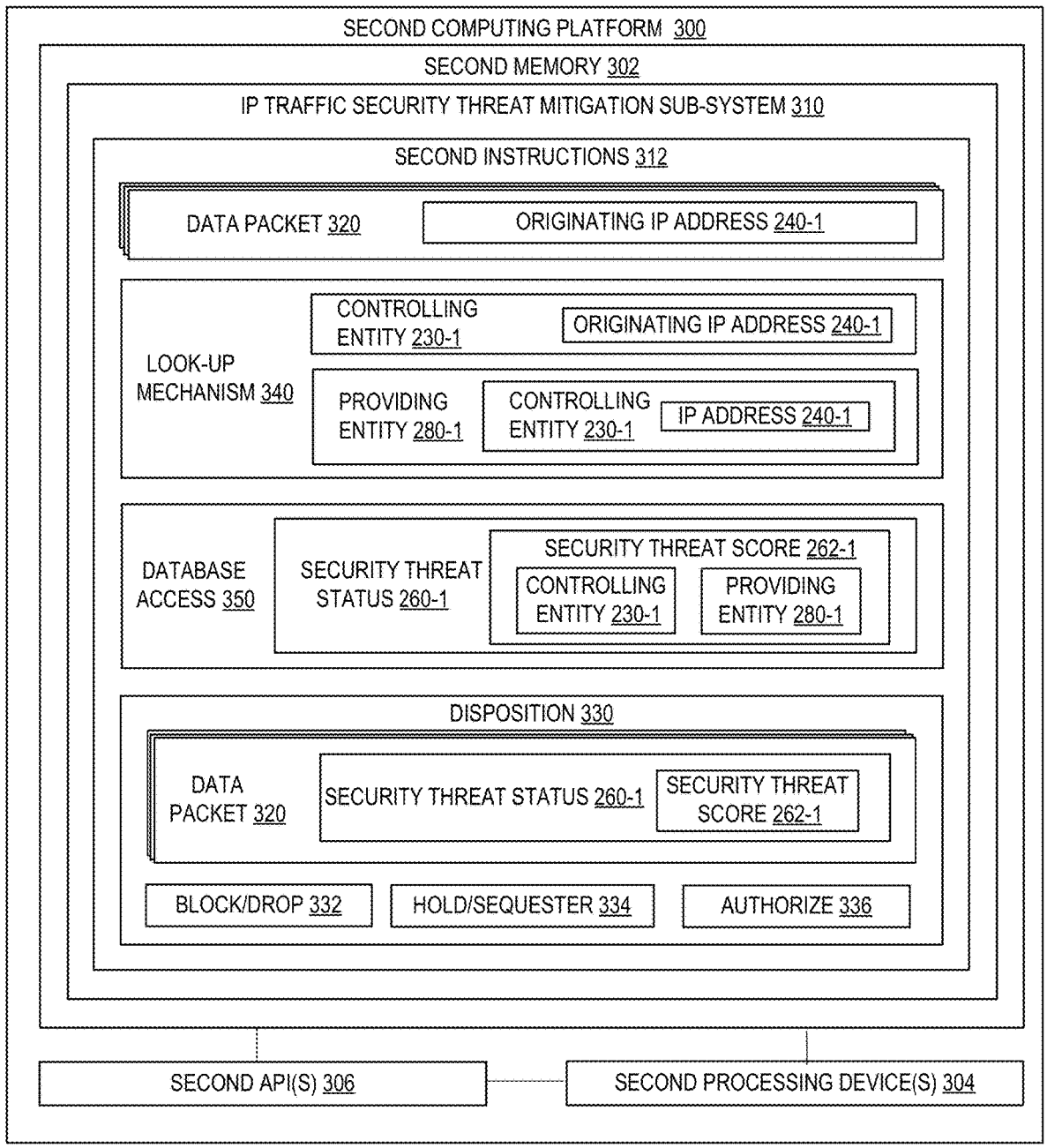
Figure 5:
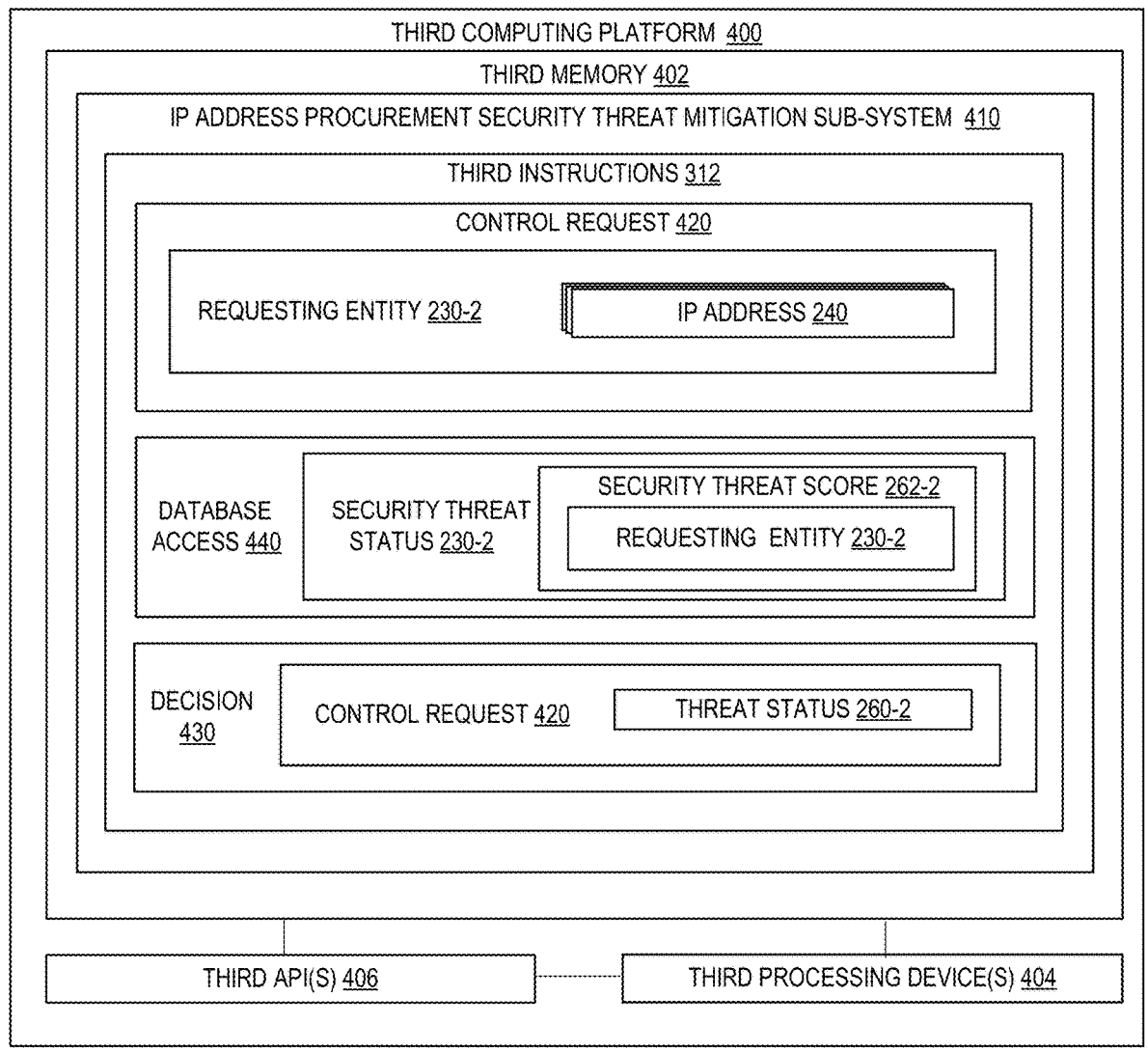
Figure 6:
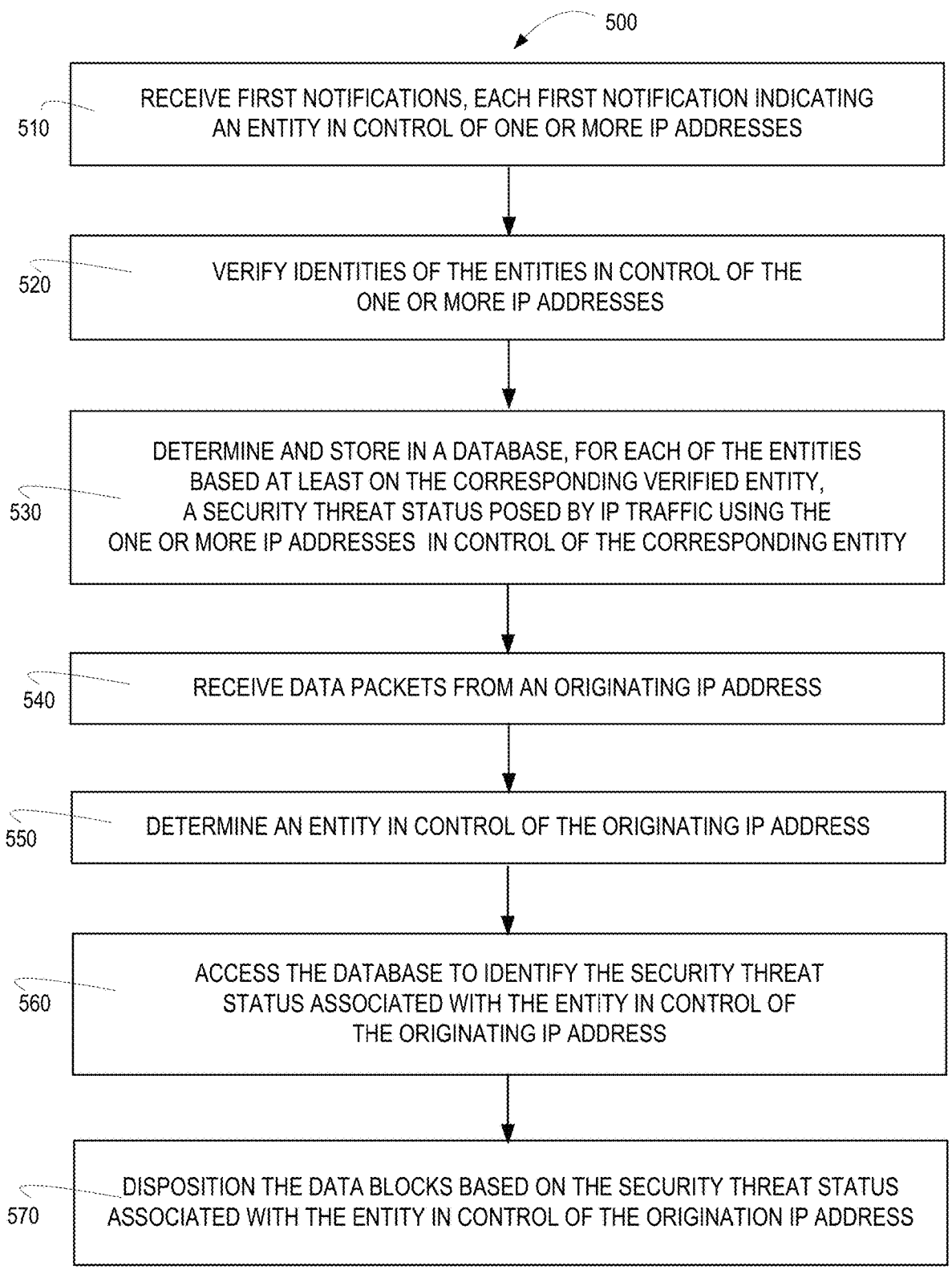

Having thus described embodiments of the disclosure in general terms, reference will now be made to the accompanying drawings, wherein:

FIG. 1 is a schematic diagram of a system for verifying identities of entities in control of IP addresses, determining a security threat status based on the verified entity and managing the disposition of data packets based on the security threat status of the entity in control of the originating IP address, in accordance with embodiment of the present invention;

FIG. 2 is a schematic diagram of a system for verifying identities of entities in control of IP addresses, determining a security threat status based on the verified entity and decisioning the providing of IP addresses to entities based on their security threat status, in accordance with embodiment of the present invention;

FIG. 3 is a block diagram of a first computing platform including an identity verification and security threat status sub-system, in accordance with embodiments of the present invention;

FIG. 4 is a block diagram of a second computing platform including an IP traffic security threat mitigation sub-system, in accordance with embodiments of the present invention;

FIG. 5 is a block diagram of a third computing platform including an IP address procurement security threat mitigation sub-system, in accordance with embodiments of the present invention; and FIG. 6 is a flow diagram of a method for verifying identities of entities in control of IP addresses, determining a security threat status based on the verified entity and managing the disposition of data packets based on the security threat status of the entity in control of the originating IP address, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processing device of a general purpose computer, special purpose computer, or other programmable data processing apparatus to produce a particular machine, such that the instructions, which execute by the processing device of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processing device may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods, computer program product and/or the like are provided for systematically verifying the identities of entities in control (i.e., rightful possessor and/or owner) of Internet Protocol (IP) addresses and determine a security threat status for each of the entities based at least on the verified identity. Thus, according to embodiments of the present invention, as data packets are received, such as at a network gateway or the like, from an originating IP address, the security threat status of the entity in control of the originating IP address is identified and the data packets are dispositioned (i.e., blocked/dropped, sequestered or authorized for further transmission) based on the security threat status of the entity in control of the IP address.

In specific embodiments of the invention, verifying the identity of the entities in control of the IP addresses includes verifying the physical location of the entity, verifying the identities of individuals in control of the entity and/or verifying the chain-of-control of the entity (e.g., the entity is controlled by an upstream entity, which is controlled by another upstream entity and so on). Moreover, in specific embodiments of the invention, verifying the identity of the entities includes tracking, over time, the identity of the entities to take into account changes in physical location of the entity, changes in individuals in control of the entity and changes in chain-of-control of the entity.

In other specific embodiments of the invention, the identities of the IP address providers (e.g., ISPs or the like) are verified and security threat status of the IP address providers are determined based on the verified status. Thus, according to embodiments of the invention, dispositioning of data packets may rely on the security threat status of the entity in control of the IP address and/or the security threat status of the entity that provided the IP address to the entity in control of the IP address.

Additionally, in other specific embodiments of the invention, the security threat status of the entities in control of the IP addresses may be used by IP address providers (e.g., ISPs or the like) to determine whether the IP address providers should provide IP addresses to an entity desiring to obtain/control IP addresses.

Turning now to the figures, FIG. 1 is a schematic diagram is system 100 for mitigating a security threat posed by Internet Protocol (IP) traffic, in accordance with embodiments of the present invention. The system 100 is implemented across a distributed communication network 110 that may include the Internet, one or more intranets, one or more cellular networks or the like. The system 100 includes a first computing platform 200 having a first memory 202 and at least one first processing device 204 in communication with the first memory 202. The first memory 202 stores identity verification ad security threat status sub-system 210 that includes first instructions 212 that are executable by the at least one first processing device 204. First instructions 212 are configured to receive first notifications 220, which indicate that an entity is in control (i.e., controlling entity 230) of one or more Internet Protocol (IP) addresses 240. The controlling entity 230 may be a legal entity or the entity may be one or more individuals not defined by a legal entity. The term "control" as used herein means rightful possessor or the owner of the IP addresses 240. The first notifications 220 may be received or otherwise harvested from any source that maintains listings of who controls IP addresses, such as a commercial or government registrar or the like.

In response to receiving first notifications 220, first instructions 210 are configured to perform identity verification 250 to verify the identities of the controlling entities 230. Identity verification 250 may follow a known set of standards for identity verification, e.g., Know-Your-Customer/Client (KYC) standards employed within financial institutions or the like for verifying identity. Such identity verification 250 may include, but is not limited to, verifying the physical location of the controlling entity 230, verifying the identity of individuals associated with or managing the controlling entity 230, verifying the chain-of-control over the controlling entity 230 (e.g., verifying the identity of upstream entities that have control over the controlling entity). In addition, identity verification 250 may include tracking/monitoring, over time, the identity of the controlling entity 230 to take into account changes in physical location, changes in the individuals associated with or managing the controlling entity 230, changes in the chain-of-control over the controlling entity 230 and the like.

In response to verifying an identity of the controlling entity 230, first instructions 212 are further configured to determine, based at least on the identity verification 250, a security threat status 260 posed by IP traffic that uses the one or more IP addresses 240 in control of the controlling entity 230. In specific embodiments of the invention, the security threat status 260 takes into account not only the verified identity 250 of the controlling entity 230 but also other data associated with the controlling entity, which may factor into determining whether the controlling entity 230 is a valid legal entity or is otherwise deemed to a suspicious entity (i.e., an entity that uses or may use the IP addresses 240 for nefarious purposes (e.g., data exfiltration or the like) or the like). In specific embodiments of the invention, the security threat status 260 is go/no-go (i.e., yes or no) indicator that merely indicates whether the controlling entity 230 is an acceptable legal entity or is not an acceptable legal entity. While in other embodiments of the invention, the security threat status 260 is a security threat score that rates the likelihood that the controlling entity 230 may be suspicious entity or the like.

In response to determining the security threat status 260, instructions 212 are further configured to store the security threat status 260 in a database that cross-references the controlling entities 230 to their corresponding security threat status 260.

The system 100 includes a second computing platform 300 having a second memory 302 and at least one second processing device 304 in communication with the second memory 302. The second memory 302 stores IP traffic security threat mitigation sub-system 310 that includes second instructions 312 that are executable by the at least one second processing device 304. Second instructions 312 are configured to receive data packets 320 from an originating IP address 240-1. The data packets 320 are the basic unit for electronic communication and may, in unison, form data files or the like. For example, data packets 320 are the means by which electronic mail (email) is communicated. The data packets 320 are received while in route to a destination. For example, second computing platform 300 may include a gateway device or the like which receives and processes the data packets 320 prior to transmission to their respective destination address.

In response to receiving the data packet 320, second instruction 312 are configured to determine the entity in control (i.e., controlling entity 230-1) of the originating IP address 240-1. Typically, such a determination will entail a lookup mechanism either an internal lookup table or a network-based (external) lookup procedure. In response to determining the controlling entity 240-1, second instructions 312 are configured to access the database of the identity verification and security threat status sub-system 210 to identify the security threat status 260-1 of the controlling entity 230-1.

In response to identifying the security threat status 260-1 of the controlling entity, second instructions 312 are further configured to disposition 330 the data packets 320 based on the security threat status 260-1 associated with the controlling entity 230-1. The disposition may include, but is not limited to, one of (i) blocking/dropping the data packets 320, (ii) holding/sequestering the data packets 320 for further investigation, and (iii) authorizing the data packets 320 for further transmission. It should be noted that the second instructions 312 configured to determine the controlling entity 230-1, identify the security threat status 260-1 and disposition 330 the data packets 330 are configured to occur in real-time (i.e., inline with the receipt of the data packets 320 by the second computing platform 200). In this regard, minimal to no delay is imparted in the overall data transmission process.

Referring to FIG. 2, a schematic diagram is presented of a system 120 for managing decisioning of IP address provisioning; in accordance with embodiments of the present invention. The system includes first computing platform 200 having the identity verification and security threat status sub-system 210 shown and discussed in relation to FIG. 1. System 120 additionally includes third computing platform 400, which includes third memory 402 and one or more third processing devices 404 in communication with third memory 402. Third memory 402 stores IP address procurement security threat mitigation sub-system 410 that includes third instructions 412 that are executable by at least one of the one or more third processing devices 404.

Third instructions 412 are configured to receive a control request 420 from an entity (i.e., requesting entity 230-2) to control one or more IP addresses 240 (i.e., requesting to become the rightful possessor, owner of the IP addresses). In response to receiving the control request 420, third instructions 412 are further configured to access the database of the identity verification and security threat sub-system 210, to identify the security threat status 260-2 of the requesting entity 230-2. In response to identifying the security threat status 260-2, third instructions 412 are further configured to decision 430 the control request 420 based on the security threat status 260-2 of the requesting entity 230-2. In other words, if the security threat status 260-2 of the requesting entity 230-2 is low or otherwise indicates minimal to no security threat, the IP address provider (e.g., Internet Service Provider (ISP) or the like) will authorize the provisioning of the IP addresses 240 to the requesting entity 230-2. However, if the security threat status 260-2 of the requesting entity 230-2 is high or otherwise indicates a significant security threat (i.e., the requesting entity 230-2 is likely to use the IP addresses for nefarious purposes), the IP address provider will deny the provisioning of the IP addresses 240 to the requesting entity 230-2.

Referring to FIG. 3, a block diagram is presented of the first computing platform 200 including the identity verification and security threat status sub-system 210, in accordance with embodiments of the present invention. The first computing platform 200 may comprise one or more computing devices (e.g., servers, storage devices, or the like), and is configured to execute instructions, algorithms, modules, routines, applications, such as instructions 212 of identity verification and security threat status sub-system 210. First computing platform 200 includes first memory 202, which may comprise volatile and non-volatile memory, such as read-only and/or random-access memory (RAM and ROM), EPROM, EEPROM, flash cards, or any memory common to computing platforms). Moreover, first memory 202 may comprise cloud storage, such as provided by a cloud storage service and/or a cloud connection service.

Further, first computing platform 200 also includes at least one first processing device 204, which may be an application-specific integrated circuit ("ASIC"), or other chipset, logic circuit, or other data processing device. First processing device(s) 204 may execute one or more first application programming interface (APIs) 206 that interface with any resident programs, such as instructions 212 of identity verification and security threat status sub-system 210 or the like, stored in the first memory 202 of the first computing platform 200 and any external programs. First processing devices(s) 204 may include various processing subsystems (not shown in FIG. 3) embodied in hardware, firmware, software, and combinations thereof, that enable the functionality of the first computing platform 200 and the operability of the first computing platform 200 on the distributed communication network 110 (shown in FIG. 1). For example, processing subsystems allow for initiating and maintaining communications and exchanging data with other networked devices, such as second and third computing platforms 300 and 400. For the disclosed aspects, processing subsystems of first processing device 204 may include any processing subsystem used in conjunction with instructions 212 of identity verification and security threat status sub-system 210 and related tools, routines, modules, sub-routines, algorithms, sub-algorithms, sub-modules thereof.

First computing platform 200 may additionally include a communications module (not shown in FIG. 3) embodied in hardware, firmware, software, and combinations thereof, that enables electronic communications between the first computing platform 200 and other network devices, such as second computing platform 300 (shown in FIG. 1) and third computing platform 400 (shown in FIG. 2). Thus, communication module may include the requisite hardware, firmware, software and/or combinations thereof for establishing and maintaining a network communication connection with one or more network devices.

First memory 202 of first computing platform 200 stores identity verification and security threat status sub-system 210 including instructions 212. First instructions 212 are configured to receive first notifications 220, which indicate that an entity is in control (i.e., controlling entity 230) of one or more Internet Protocol (IP) addresses 240. As previously discussed, the controlling entity 230 may be a legal entity or the entity may be one or more individuals not defined by a legal entity. Further, the term "control" as used herein means rightful possessor or the owner of the IP addresses 240.

In optional embodiments of the invention, first instructions 212 are configured to receive second notifications 270 that indicate an entity that provides (i.e., providing entity 280) to other entities, specifically controlling entities 230. For example, the providing entity may be an Internet Service Provider (ISP), and IP address broker or the like.

The first and second notifications 220 and 270 may be received or otherwise harvested from any source that maintains listings of who controls IP addresses, such as a commercial or government registrar or the like. Moreover, first and second notifications 270 may be received in response to inputs provided to the sub-system 210.

In response to receiving first notifications 220 and, on some embodiments second notifications 280, first instructions 210 are configured to perform identity verification 250 to verify the identities of the IP address controlling entities 230 and, in some embodiments, the IP address providing entities 280. As previously discussed, identity verification 250 may follow a known set of standards for identity verification, e.g., Know-Your-Customer/Client (KYC) standards employed within financial institutions or the like for verifying identity. Such identity verification 250 may include, but is not limited to, (i) location verification 252 which verifies the physical location of the controlling entity 230 and/or providing entity 280, (ii) individual(s) verification 254, which verifies the identity of individuals associated with or managing the controlling entity 230 and/or providing entity 280, and (iii) chain-of-control verification 256, which verifies the chain-of-control over the controlling entity 230 (e.g., verifying the identity of upstream entities that have control over the controlling entity). In other words, chain-of-control verification 256 ensures that the controlling entity and/or providing entity 280 are not just so called "shell" entities formed for purposes of hiding the actual entity that has control over the entity.

In addition, identity verification 250 may include tracking/monitoring 258, over time, the identities of the controlling entity 230 and/or providing entity 280 to take into account changes in physical location of the controlling entity 230 and/or providing entity 280, changes in the individuals associated with or managing the controlling entity 230 and/or, changes in the chain-of-control over the controlling entity 230 and/or providing entity 280 and the like.

In response to verifying an identity of the controlling entity 230 and/or providing entity 280, first instructions 212 are further configured to determine, based at least on the identity verification 250, a security threat status 260 posed by IP traffic that uses the one or more IP addresses 240 in control of the controlling entity 230 or provided by the providing entity 280. In specific embodiments of the invention, the security threat status 260 takes into account not only the verified identity 250 of the controlling entity 230 and/or the providing entity 280 but also other data associated with the controlling entity 230 and/or providing entity 280, which may factor into determining whether the controlling entity 230 or providing entity 280 is a valid legal entity or is otherwise deemed to a suspicious entity (i.e., an entity that uses or may use the IP addresses 240 for nefarious purposes (e.g., data exfiltration or the like) or the like).

In specific embodiments of the invention, the controlling entities 230 and the providing entities 280 each have separate security threat status 260, while in other embodiments of the invention, the combination of the controlling entity 230 and the providing entity 280 that provided the IP addresses to the controlling entity 230 is reflected in one security threat status 260.

In specific embodiments of the invention, the security threat status 260 is go/no-go (i.e., yes or no) indicator that merely indicates whether the controlling entity 230 is an acceptable entity or is not an acceptable entity. While in other embodiments of the invention, the security threat status 260 is a security threat score 262 that rates the likelihood that the controlling entity 230 may be suspicious entity or the like. In other embodiments of the invention, a security threat score 262 is the basis for the identity verification and security threat status sub-system 210 to render a go/no-go (i.e., yes or no) indicator/decision to IP traffic threat mitigation sub-system.

In response to determining the security threat status 260, instructions 212 are further configured to store the security threat status 260 in a database 290 that cross-references the controlling entities 230 and/or providing entities 280 to their corresponding security threat status 260, and, in some embodiments, the security threat score 262.

Referring to FIG. 4, a block diagram is presented of the second computing platform 300 including the IP traffic security threat mitigation sub-system 310, in accordance with embodiments of the present invention. The second computing platform 300 may comprise one or more computing devices (e.g., gateway devices, servers, storage devices, or the like), and is configured to execute instructions, algorithms, modules, routines, applications, such as second instructions 312 of IP traffic security threat mitigation sub-system 310. Second computing platform 300 includes second memory 302, which may comprise volatile and non-volatile memory, such as read-only and/or random-access memory (RAM and ROM), EPROM, EEPROM, flash cards, or any memory common to computing platforms). Moreover, second memory 302 may comprise cloud storage, such as provided by a cloud storage service and/or a cloud connection service.

Further, second computing platform 300 also includes at least one second processing device 304, which may be an application-specific integrated circuit ("ASIC"), or other chipset, logic circuit, or other data processing device. Second processing device(s) 304 may execute one or more second application programming interface (APIs) 306 that interface with any resident programs, such as second instructions 312 of IP traffic security threat mitigation sub-system 310 or the like, stored in the second memory 302 of the second computing platform 300 and any external programs. Second processing devices(s) 304 may include various processing subsystems (not shown in FIG. 4) embodied in hardware, firmware, software, and combinations thereof, that enable the functionality of the second computing platform 300 and the operability of the second computing platform 300 on the distributed communication network 110 (shown in FIG. 1). For example, processing subsystems allow for initiating and maintaining communications and exchanging data with other networked devices, such as first and third computing platforms 200 and 400. For the disclosed aspects, processing subsystems of second processing device 304 may include any processing subsystem used in conjunction with second instructions 312 of IP traffic security threat mitigation sub-system 310 and related tools, routines, modules, sub-routines, algorithms, sub-algorithms, sub-modules thereof.

Second computing platform 300 may additionally include a communications module (not shown in FIG. 4) embodied in hardware, firmware, software, and combinations thereof, that enables electronic communications between the second computing platform 300 and other network devices, such as first computing platform 200 (shown in FIGS. 1 and 2) and third computing platform 400 (shown in FIG. 2). Thus, communication module may include the requisite hardware, firmware, software and/or combinations thereof for establishing and maintaining a network communication connection with one or more network devices.

Second memory 302 of second computing platform 300 stores IP traffic security threat mitigation sub-system 310 including second instructions 312. Second instructions 312 are configured to receive data packets 320 from an originating IP address 240-1. In response to receiving the data packet 320, second instruction 312 are configured to determine the entity in control (i.e., controlling entity 230-1) of the originating IP address 240-1 and/or, in some embodiments of the invention, the providing entity 280-1, which provided the originating IP address 240-1 to the controlling entity 230-1. Typically, such a determination will entail a lookup mechanism 340 either an internal lookup table or a network-based (external) lookup procedure.

In response to determining the controlling entity 240-1, second instructions 312 are configured to perform database access 350 to access the database 290 of the identity verification and security threat status sub-system 210 to identify the security threat status 260-1 of the controlling entity 230-1 and/or the security threat status 260-1 of the providing entity 280-1 and/or, in some embodiments, the composite security threat status 260-1 that reflects both the controlling entity 230-1 and the providing entity 280-1.

In response to identifying the security threat status 260-1 of the controlling entity and/or providing entity 280-1, second instructions 312 are further configured to disposition 330 the data packets 320 based on the security threat status 260-1 associated with the controlling entity 230-1, the providing entity 280-1 or both the controlling entity 230-1 and the providing entity 280-1. The disposition 330 may include, but is not limited to, one of (i) blocking/dropping 332 the data packets 320, (ii) holding/sequestering 334 the data packets 320 for further investigation, and (iii) authorizing 336 the data packets 320 for further transmission. It should be noted that the second instructions 312 configured to determine the controlling entity 230-1 and/or providing entity 280-1, identify the security threat status 260-1 and disposition 330 the data packets 330 are configured to occur in real-time (i.e., inline with the receipt of the data packets 320 by the second computing platform 200). In this regard, minimal to no delay is imparted in the overall data transmission process.

Referring to FIG. 5, a block diagram is presented of the third computing platform 400 including the IP address procurement security threat mitigation sub-system 410, in accordance with embodiments of the present invention. The third computing platform 400 may comprise one or more computing devices (e.g., application servers, PCs, storage devices, or the like), and is configured to execute instructions, algorithms, modules, routines, applications, such as third instructions 412 of IP address procurement security threat mitigation sub-system 410. Third computing platform 400 includes third memory 402, which may comprise volatile and non-volatile memory, such as read-only and/or random-access memory (RAM and ROM), EPROM, EEPROM, flash cards, or any memory common to computing platforms). Moreover, third memory 402 may comprise cloud storage, such as provided by a cloud storage service and/or a cloud connection service.

Further, third computing platform 400 also includes at least one third processing device 404, which may be an application-specific integrated circuit ("ASIC"), or other chipset, logic circuit, or other data processing device. Third processing device(s) 404 may execute one or more third application programming interface (APIs) 406 that interface with any resident programs, such as third instructions 412 of IP address procurement security threat mitigation sub-system 410 or the like, stored in the third memory 402 of the third computing platform 400 and any external programs. Third processing devices(s) 404 may include various processing subsystems (not shown in FIG. 5) embodied in hardware, firmware, software, and combinations thereof, that enable the functionality of the third computing platform 400 and the operability of the third computing platform 400 on the distributed communication network 110 (shown in FIG. 2). For example, processing subsystems allow for initiating and maintaining communications and exchanging data with other networked devices, such as first and second computing platforms 200 and 300. For the disclosed aspects, processing subsystems of third processing device 404 may include any processing subsystem used in conjunction with third instructions 412 of IP address procurement security threat mitigation sub-system 410 and related tools, routines, modules, sub-routines, algorithms, sub-algorithms, sub-modules thereof.

Third computing platform 400 may additionally include a communications module (not shown in FIG. 5) embodied in hardware, firmware, software, and combinations thereof, that enables electronic communications between the third computing platform 400 and other network devices, such as first computing platform 200 (shown in FIG. 2). Thus, communication module may include the requisite hardware, firmware, software and/or combinations thereof for establishing and maintaining a network communication connection with one or more network devices.

Third memory 402 of second computing platform 300 stores IP address procurement security threat mitigation sub-system 410 including third instructions 412. Third instructions 412 are configured to receive a control request 420 from an entity (i.e., requesting entity 230-2) to control one or more IP addresses 240 (i.e., requesting to become the rightful possessor, owner of the IP addresses). In response to receiving the control request 420, third instructions 412 are further configured to perform database access 440 to access the database 290 of the identity verification and security threat sub-system 210, to identify the security threat status 260-2 of the requesting entity 230-2. In response to identifying the security threat status 260-2, third instructions 412 are further configured to decision 430 the control request 420 based on the security threat status 260-2 of the requesting entity 230-2. In other words, if the security threat status 260-2 of the requesting entity 230-2 is low or otherwise indicates minimal to no security threat, the IP address provider (e.g., Internet Service Provider (ISP) or the like) will authorize the provisioning of the IP addresses 240 to the requesting entity 230-2. However, if the security threat status 260-2 of the requesting entity 230-2 is high or otherwise indicates a significant security threat (i.e., the requesting entity 230-2 is likely to use the IP addresses for nefarious purposes), the IP address provider will deny the provisioning of the IP addresses 240 to the requesting entity 230-2.

Referring to FIG. 6, a flow diagram is depicted of a method 500 for mitigating the threat posed by IP traffic, in accordance with embodiments of the present invention. At Event 510, first notifications are received or input. Each first notification indicates an entity in control of one or more IP addresses. The entity may be a legal entity (LLC, partnership, corporations or the like) or one or more individuals that control (i.e., rightfully possess or own) the IP addresses.

In response to receiving the first notifications, at Event 520, the identities of the entities are verified. Identity verification may implement known or future known identity verification standards, such as KYC standards or the like. Identity verification may include, but is not limited to, verification of the physical location of the entities, verification of the identities of the individuals managing or in control of the entities, verification of the chain-of-control of the entity (i.e., upstream or downstream control of the entity, meaning entities that control the entity or entities that the entity controls).

In response to identity verification, at Event 530, a security threat status is determined for each entity based at least on the verified identity. The security threat status indicates the threat posed by IP traffic that uses the IP addresses as the originating IP address. As previously discussed, in specific embodiments the security threat status may take the form of a security threat score that indicates the level of threat posed by IP traffic that uses the IP addresses as the originating IP address. In response to determining the security threat status, the statuses are stored in a database that correlates the statuses to their respective entities.

At Event 540, data packets are received from an originating IP address. For example, the data packets may be received at a gateway device prior to entering an intranet or the like. In response to receiving the data packets, at Event 550, an entity in control of the originating IP address is determined. For example, a lookup mechanism may be implemented to determine the entity in control (i.e., rightful possessor, owner or the like) of the originating IP address.

In response to determining the entity in control of the originating IP address, at Event 550, the database is accessed to identify the security threat status associated with the entity in control of the originating IP address. In response to identifying the security threat status, at Event 570, the data blocks are dispositioned based on the security threat status associated with the entity in control of the originating IP address. Disposition may include, but is not limited to, (i) blocking/dropping the data packets, (ii) holding/sequestering the data packets for further suspicious activity investigation, and/or (iii) authorizing the data packets for further network transmission.

Thus, present embodiments of the invention provide for systematically verifying the identities of entities in control of Internet Protocol (IP) addresses and determining a security threat status for each of the entities based at least on the verified identity. As incoming data packets are received from an originating IP address, the invention provides for the entity in control of the originating IP address and their corresponding security threat status to be identified and data packets are dispositioned i.e., blocked/dropped, sequestered or authorized for further transmission, based on the security threat status of the entity in control of the IP address.

The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for mitigating a security threat posed by Internet Protocol (IP) traffic, the system comprising:
    a first computing platform including a first memory and at least one first processing device in communication with the first memory, wherein the first memory stores an identity verification and security threat status sub-system that includes first instructions that are executable by one or more of the at least one first processing device and configured to:
        receive first notifications, each first notification indicating a first entity in control of one or more IP addresses and second notifications, each second notification indicating a second entity responsible for providing the one or more IP addresses to the one or more first entities,
        verify identities of (i) the first entities in control of the one or more IP addresses, and (ii) the second entities responsible for providing the one or more IP addresses to the one or more first entities, wherein verifying the identities of (i) and (ii) is based on a Know-Your-Customer (KYC) standard and includes (a) verifying physical locations of the first and second entities, (b) verifying identities of individuals in control of the first entity and second entities, and (c) verifying identities of one or more upstream entities in control of the first entity and second entities,
        determine, for each of the first entities based at least on the corresponding verified identity, a first security threat status posed by IP traffic using the one or more IP addresses in control of the corresponding first entity,
        determine, for each of the second entities based at least on the corresponding verified identity, a second security threat status posed by IP traffic using the one or more IP addresses provided by a corresponding second entity,
        provide for the least one first processing device to store, in the first memory, (i) the first security threat statuses correlated to corresponding ones of the first entities and (ii) the second security threat status correlated to corresponding ones of the second entities; and
    a second computing platform including a second memory and at least second processing device in communication with the second memory, wherein the second memory stores IP traffic security threat mitigation sub-system that includes second instructions that are executable by one or more of the at least one second processing devices and configured to:
        receive data packets having an originating IP address,
        determine an entity in control of the originating IP address based on the KYC standard,
        provide for the at least one second processing device to access the identity verification and security threat status sub-system to identify (i) the first security threat status associated with the entity in control of the originating IP address and (ii) the second security threat status associated with one of the second entities responsible for providing the IP address to the entity in control of the originating IP address, and
        disposition the data packets based on (i) the first security threat status associated with the entity in control of the originating IP address and (ii) the second security threat status associated with one of the second entities responsible for providing the IP address to the entity in control of the originating IP address,
    wherein the security threat is using a shell entity controlling one or more IP addresses.

2. The system of claim 1, wherein the first instructions configured to verify identities of (i) the first entities in control of the one or more IP addresses and (ii) the second entities responsible for providing the one or more IP addresses to the one or more first entities are further configured to track, over time, the identities of the first entities in control of the one or more IP addresses and the second entities responsible for providing the one or more IP addresses to the one or more first entities.

3. The system of claim 1, wherein the first instructions configured to determine (i) the first security threat status are further configured to determine a first security threat score associated with the first entity in control of the originating IP address and (ii) the second security threat status are further configured to determine a second security score associated with the second entity responsible for providing the one or more IP addresses to the one or more first entities.

4. The system of claim 3, wherein the second instructions configured to provide for the at least one second processing device to access the identity verification and security threat status sub-system to identify the first security threat status and the second security threat status are further configured to provide for the at least one second processing device to access the identity verification and security threat status sub-system to identify the first security threat score and the second security threat score and wherein the second instructions configured to disposition the data packets are further configured to disposition the data packets based on the first security threat score and the second security threat score.

5. The system of claim 1, wherein the second instructions configured to disposition the data packets further defines the disposition as one selected from the group consisting of (i) hold the data packets for suspicious intent investigation, (ii) block the data packets from further data transmission and (iii) allow the data packets for further data transmission.

6. The system of claim 1, further comprising including a third computing platform including a third memory and at least one third processing device in communication with the third memory, wherein the third memory stores IP address procurement security threat mitigation sub-system that includes third instructions that are executable by one or more of the at least one third processing devices and configured to:
- receive a request by an entity to control one or more IP addresses,
- provide for the at least one third processing device to access the identity verification and security threat status sub-system to identify the first security threat status associated with the entity requesting control of the one or more IP addressed, and
- decision the request by the entity for control of the one or more IP addresses based on the first security threat status.

7. A computer-implemented method for mitigating a security threat posed by Internet Protocol (IP) traffic, the computer-implemented method is executed by one or more computer processing devices and comprises:
- receiving first notifications, each first notification indicating an entity in control of one or more IP addresses and second notifications, each second notification indicating a second entity responsible for providing the one or more IP addresses to the one or more first entities;
- verifying identities of (i) the first entities in control of the one or more IP addresses, and (ii) the second entities responsible for providing the one or more IP addresses to the one or more first entities, wherein verifying the identities of (i) and (ii) is based on a Know-Your-Customer (KYC) standard and includes (a) verifying physical locations of the first and second entities, (b) verifying identities of individuals in control of the first and second entities, and (c) verifying identities of one or more upstream entities in control of the first and second entities;
- determining, for each of the first entities based at least on the corresponding verified identity, a first security threat status posed by IP traffic using the one or more IP addresses in control of the corresponding first entity;
- determining, for each of the second entities based at least on the corresponding verified identity, a second security threat status posed by IP traffic using the one or more IP addresses provided by a corresponding second entity;
- storing, in a database, (i) the first security threat status correlated to a corresponding one of the first entities and (ii) the second security threat status correlated to a corresponding one of the second entities;
- receiving data packets having an originating IP address;
- in response to receiving the data packets, determining an entity in control of the originating IP address based on the KYC standard;
- accessing the database to identify (i) the first security threat status associated with the entity in control of the originating IP address and (ii) the second security threat status associated with one of the second entities responsible for providing the IP address to the entity in control of the originating IP address; and
- dispositioning the data packets based on (i) the first security threat status associated with the entity in control of the originating IP address and (ii) the second security threat status associated with one of the second entities responsible for providing the IP address to the entity in control of the originating IP address, wherein the security threat is using a shell entity controlling one or more IP addresses.

8. The computer-implemented method of claim 7, wherein verifying the identities of (i) the first entities in control of the one or more IP addresses and (ii) the second entities responsible for providing the one or more IP addresses to the one or more first entities further comprises tracking, over time, the identities of the first entities in control of the one or more IP addresses and the second entities responsible for providing the one or more IP addresses to the one or more first entities.

9. The computer-implemented method of claim 7, wherein determining (i) the first security threat status further comprise determining a first security threat score associated with the first entity in control of the originating IP address and (ii) the second security threat status further comprise determining a second security score associated with the second entity responsible for providing the one or more IP addresses to the one or more first entities and wherein accessing the database to identify the first security threat status and the second security threat status further comprises accessing the database to identify the first security threat score and the second security threat score and wherein dispositioning the data packets further comprises dispositioning the data packets based on the first security threat score and the second security threat score.

10. The computer-implemented method of claim 7, further comprising:
- receiving a request by an entity to control one or more IP addresses;
- accessing the database to identify the first security threat status associated with the entity requesting control of the one or more IP addressed; and
- decisioning the request by the entity for control of the one or more IP addresses based on the first security threat status.

11. A computer program product for mitigating a security threat posed by Internet Protocol (IP) traffic, comprising:
a non-transitory computer-readable medium comprising:
- a first set of codes for causing a computer to receive first notifications, each first notification indicating an entity in control of one or more IP addresses and second notifications, each second notification indicating a second entity responsible for providing the one or more IP addresses to the one or more first entities;
- a second set of codes for causing a computer to verify identities of (i) the first entities in control of the one or more IP addresses, and (ii) the second entities responsible for providing the one or more IP addresses to the one or more first entities, wherein verifying the identities of (i) and (ii) is based on a Know-Your-Customer (KYC) standard and includes (a) verifying physical locations of the first and second entities, (b) verifying identities of individuals in control of the first and second entities, and (c) verifying identities of one or more upstream entities in control of the first and second entities;
- a third set of codes for causing a computer to determine (i) for each of the first entities based at least on the corresponding verified identity, a first security threat status posed by IP traffic using the one or more IP addresses in control of the corresponding first entity and (ii) for each of the second entities based at least on the corresponding verified identity, a second security threat status posed by IP traffic using the one or more IP addresses provided by a corresponding second entity;

a fourth set of codes for causing a computer to store, in a database, (i) the first security threat status correlated to a corresponding one for of the first entities and (ii) the second security threat status correlated to a corresponding one of the second entities;

a fifth set of codes for causing a computer to receive data packets having an originating IP address;

a sixth set of codes for causing a computer to, in response to receiving the data packets, determine an entity in control of the originating IP address based on the KYC standard;

a seventh set of codes for causing a computer to access the database to identify (i) the first security threat status associated with the entity in control of the originating IP address and (ii) the second security threat status associated with one of the second entities responsible for providing the IP address to the entity in control of the originating IP address; and an eighth set of codes for causing a computer to disposition the data packets based on (i) the first security threat status associated with the entity in control of the originating IP address and (ii) the second security threat status associated with one of the second entities responsible for providing the IP address to the entity in control of the originating IP address, wherein the security threat is using a shell entity controlling one or more IP addresses.

12. The computer program product of claim 11, wherein the second set of codes are further configured to cause the computer to track, over time, the identities of the first entities in control of the one or more IP addresses and the second entities responsible for providing the one or more IP addresses to the one or more first entities.

13. The computer program product of claim 11, wherein the computer-readable medium further comprises:

a ninth set of codes for causing a computer to receive a request by an entity to control one or more IP addresses;

a tenth set of codes for causing a computer to access the database to identify the first security threat status associated with the entity requesting control of the one or more IP addressed; and an eleventh set of codes for causing a computer to decision the request by the entity for control of the one or more IP addresses based on the first security threat status.

* * * * *